US006658711B1

(12) United States Patent
Benson

(10) Patent No.: US 6,658,711 B1
(45) Date of Patent: Dec. 9, 2003

(54) HOSE FITTING INSERTION APPARATUS

(76) Inventor: Joel Kent Benson, 99 Arizona Sunset Rd. NE., Rio Rancho, NM (US) 87124

(*) Notice: Subject to any disclaimer, the term of this patent is extended or adjusted under 35 U.S.C. 154(b) by 152 days.

(21) Appl. No.: 10/074,570

(22) Filed: Feb. 12, 2002

(51) Int. Cl.[7] .................................................. B23P 19/04
(52) U.S. Cl. ................................ 29/237; 29/270; 269/6; 269/3
(58) Field of Search ................................ 269/6, 3, 902, 269/165–171.5; 29/237, 270, 239

(56) References Cited

U.S. PATENT DOCUMENTS

| | | | | | |
|---|---|---|---|---|---|
| 1,094,978 | A | * | 4/1914 | Church | 29/237 |
| 2,821,775 | A | | 2/1958 | Pavelka | |
| 2,916,812 | A | | 12/1959 | Milo | |
| 2,949,947 | A | * | 8/1960 | Story | 269/167 |
| 4,811,441 | A | | 3/1989 | Potesta | |
| 4,854,568 | A | * | 8/1989 | Baeza et al. | 269/268 |
| 5,009,134 | A | | 4/1991 | Sorenson et al. | |
| 5,099,561 | A | | 3/1992 | Santiago Lozano | |
| 5,161,787 | A | * | 11/1992 | Hobday | 269/6 |
| 5,222,420 | A | | 6/1993 | Sorensen et al. | |
| 5,375,309 | A | | 12/1994 | Dunn | |
| 5,833,359 | A | * | 11/1998 | Hollenbach | 269/6 |
| 6,029,964 | A | * | 2/2000 | Bohl | 269/6 |
| 2002/0042979 | A1 | * | 4/2002 | Ishida et al. | 29/237 |

* cited by examiner

*Primary Examiner*—Lee Wilson

(57) ABSTRACT

Apparatus for rapid insertion of hose fittings into the ends of hoses, having a hand-controlled fitting installation mechanism movable along a travel bar, the mechanism having a vertical paid used to push the hose fitting into the end of the hose; a separate attached hose mounting platform for holding the hose end above and parallel to the bar holding the hand-controlled mechanism; and a hose locking lever attached to the top of the hose mounting platform.

27 Claims, 2 Drawing Sheets

HOSE FITTING INSERTION APPARATUS

BACKGROUND OF THE INVENTION

The invention pertains to apparatus for installing a hose fitting into the open end of a flexible hose, and more particularly to such apparatus for allowing rapid installation of the fitting, with minimal difficulty in securing the hose end during the fitting installation process.

Though apparatus of this general type is not new, to accomplish the operation in a time efficient manner for a wide variety of applications there is a need for an easily operable, hand controlled mechanism, which is entirely portable for use in any needed location, e.g. in the engine room of a ship, the wing of an aircraft, or within or on a piece of capital equipment that needs repairing. There is a need for such apparatus with which the operator may both hold the hose end securely in position to receive the hose fitting, and also quickly push the hose fitting into the secured end of the hose, to permanently install the fitting in the hose.

The invention accomplishes the fitting pushing function by means of a hand-operated fitting installation mechanism movable along a normally horizontal metal travel bar by hand working of the mechanism handle, and having a normally vertical pad which makes contact with the outer edge of the fitting after the fitting is positioned for insertion in the hose end, and which is used to push the fitting into the hose. The hose end securing function is facilitated by means of a holding platform mounted above the travel bar on which the mechanism travels, as further detailed below, having an attached locking lever to lock the hose end to the mounting platform during the fitting installation process.

SUMMARY OF THE INVENTION

The invention is an apparatus for rapid insertion and permanent installation of hose fittings into the ends of rubber or other flexible hoses, having in the preferred embodiment a hand-controlled, movable, fitting installation mechanism which is movable along a normally horizontal travel bar, said mechanism having a vertical pad as a pusher means used to abut the outer end of the hose fitting so that the mechanism may be used to force the fitting into the end of the hose; a separate though attached hose mounting platform, preferably having a V-shaped trough, for holding the end of the hose into which the fitting is to be inserted and installed, positioned and configured to hold the hose end above and generally parallel to the travel bar holding the fitting installation mechanism; and a hose securing means attached to the top of the hose mounting platform, which means is lever-activated in the preferred embodiment, as a means to secure the hose in place before the fitting installation mechanism is used to force the fitting into the end of the hose.

DESCRIPTION OF THE PREFERRED EMBODIMENTS

Structure

Figure 1:
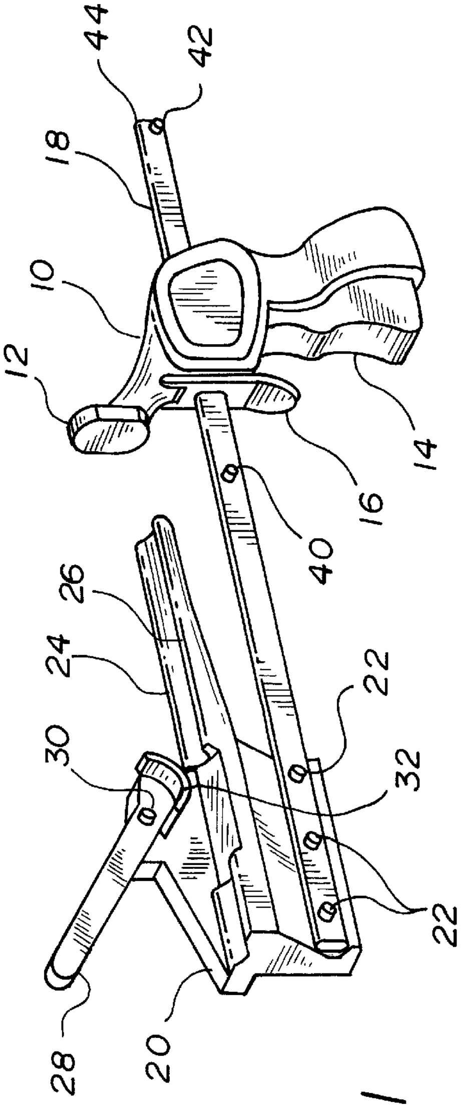
FIG. 1 is a perspective view of the preferred embodiment of the invention, without the hose end or hose fitting being shown.
Figure 2:
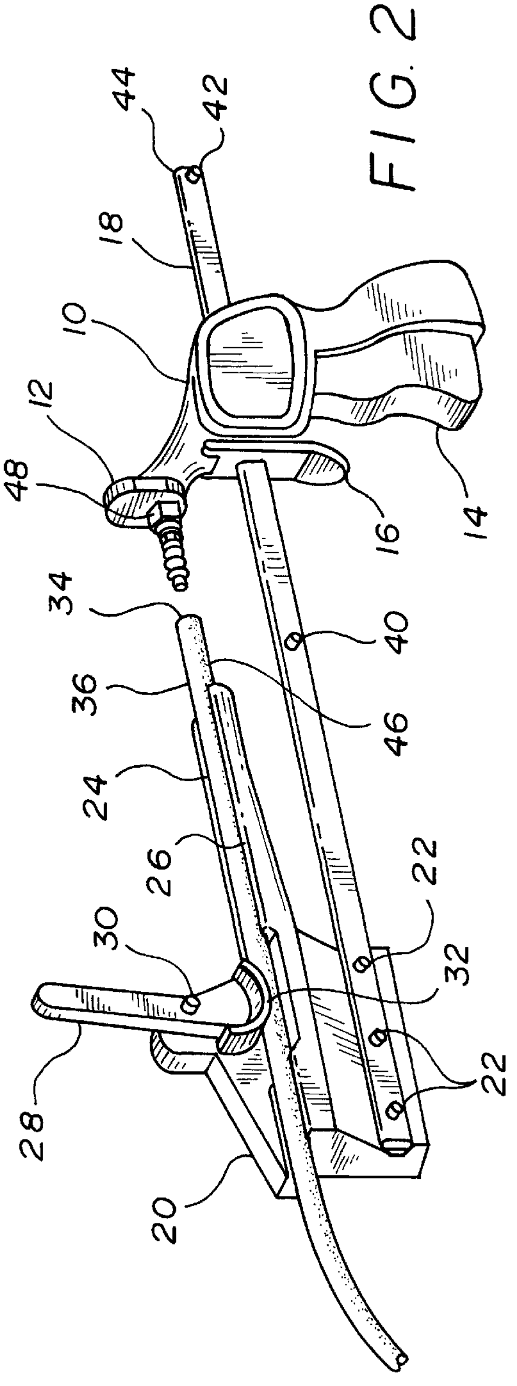
FIG. 2 is a perspective view as in FIG. 1, but also showing the clamped hose and the hose fitting, showing the position of the vertical pad of the hand-controlled mechanism when the mechanism first abuts the outer end of the hose fitting, just before the apparatus is used to install the hose fitting into the end of the hose. For clarity of illustration only, the fitting is shown completely separated from the end of the hose in this figure.
Figure 3:
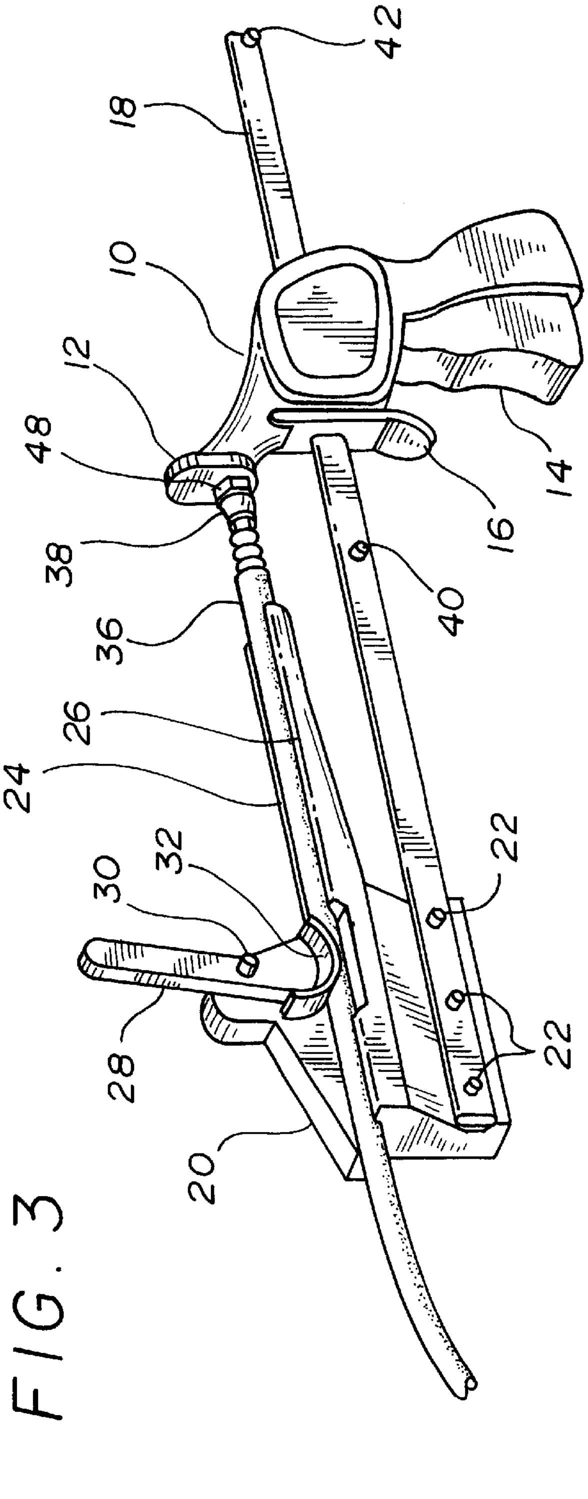
FIG. 3 is a perspective view as in FIG. 2, but showing the position of the apparatus, hose and hose fitting when the hose fitting has been fully inserted and installed within the end of the hose by operation of the apparatus.

Referring now to the drawings, in which like reference numbers denote like or corresponding elements, the invention has a hand-controlled movable fitting installation mechanism 10, having a vertical pad 12 for pressing a hose fitting into the end of a hose, mechanism 10 also having a handle 14 and a release trigger 16; a horizontal travel bar 18 along which mechanism 10 may be moved by hand through hand clamping of the handle 14 so as to move leftward in FIGS. 1–3; and a hose holding platform 20, attached to travel bar 18 by bolts 22, said platform 20 having an ergonomically designed rightwardly protruding horizontal wing 24 with a trough 26 of V-shaped cross section for holding the hose end into which a fitting is to be inserted, and a hose locking lever 28, rotatably attached to platform 20 by a bolt and spacer assembly 30, lever 28 having at its bottom an elliptically-shaped compression member 32, for securing the hose end in trough 26 prior to installation of the fitting. As seen in FIG. 1, the platform 20 is so mounted and configured as to hold trough 26 above and at least substantially parallel to travel bar 18.

The lever 28 is so dimensioned and the bolt and spacer assembly 30 is so positioned as to allow end 34 of hose 36 to be passed into trough 26 beneath compression member 32 in one configuration lever 28, when the upper end of lever 28 is moved to the left of vertical, as in FIG. 1, so as to move compression member 32 to the right and upward, to provide the maximum opening between compression member 32 and trough 26, with the dimensions being such as to accommodate hose sizes of interest, typically in the ¼"–¾" O.D. range though the present invention could of course readily be modified for use with larger hoses. Conversely, when the upper end of lever 28 is moved to the right away from the orientation shown in FIG. 1, to the orientation shown in FIGS. 2–3, this will cause compression member 32 to move to the left and downward, so as to firmly press said hose downward into a locked configuration in said trough.

The more horizontal/longitudinal force is applied to hose end 34, via pad 12 through fitting 38 during motion of fitting installation mechanism 10 to the left along travel bar 18 in FIG. 3, the further back the elliptical compression member 32 is pushed, and as a result the pressure applied to locking the hose in place increases. The mechanical action of the elliptical compression member 32 thus ensures that the hose will not slip rearward during the fitting insertion process.

The fitting installation mechanism 10 is a mechanism of a form well known in the art, having a one-way drive means for moving the fitting installation mechanism 10 to the left along travel bar 18 in FIGS. 1–3, which one-way drive means is operated manually by successive hand compressions of handle 14, and having a release trigger 16, which releases the mechanism from operation of the one-way drive means, whereupon the fitting installation mechanism 10 may be manually moved to the right along travel bar 18. Several forms of such mechanisms are disclosed in U.S. Pat. No.

5,009,134 on the invention of Sorensen et al, at Col. 1, lines 29–54; Col. 2, line 48- Col. 6, line 67 and FIGS. 1–12, said disclosures of said patent being incorporated herein by this reference. Though the present invention is not limited to use of a particular form of fitting installation mechanism 10, the preferred embodiment uses this component from the product which bears the trademark QUICK-GRIP® and the name Bar Clamp Spreader and the above-referenced patent number, and is manufactured by American Tool Company. This component is essentially the same as that shown in FIG. 5 of the above-referenced patent, but differs from the FIG. 5 structure in that the marketed product has two of the elements numbered 132 in FIG. 5 of the patent, instead of one as shown in FIG. 5. The above-referenced patent uses opposite terminology from this patent application, as to the relative motion of the components corresponding to fitting installation mechanism 10 and travel bar 18, referring to the former as a "fixed jaw" and the latter as movable. Col. 1, lines 29–38; Col. 2, line 48 - Col. 3, line 57. But this terminology difference is immaterial, since the operation of the present invention only requires relative motion of fitting installation mechanism 10 and travel bar 18, in conjunction with the other matters disclosed herein.

Protruding from the side of travel bar 18 is a stop pin 40, suitably positioned between the end of trough 26 and mechanism 10, so as to prevent pad 12 from actually hitting the outer end of trough 26 during the fitting insertion operation, which could damage the apparatus, while yet being close enough to trough 26 to allow sufficient motion of mechanism 10 and pad 12 to allow the fitting insertion operation to be carried out as detailed below; and another stop pin 42, positioned near the end 44 of travel bar 18, so that mechanism 10 will not be allowed to come off of travel bar 18.

The wing 24 has smooth corners and edges, forming an ergonomic design for allowing the operator to wrap fingers around the hose end lying in the trough 26 to help prevent the hose from buckling up during the fitting insertion operation.

Looking at the preferred embodiment with reference to certain means for performing certain functions recited in the claims, it may be seen that trough 26, lever 28 and compression member 32 together constitute a means for securing end portion 46 of hose 36 in a fixed position upon an axis coinciding with and extending from the axis of end 34 of hose 36, an axis perpendicular to and extending outward through the center of the cross section of end 34; and that pad 12 constitutes a pusher means, located upon said axis; and that mechanism 10 and travel bar 18 constitute a pusher movement means, located off of and normally below said axis and connected to said pusher means, for moving said pusher means on said axis toward said end portion 46 of said hose 36 sufficiently to push said fitting 38 into said end portion 46 of hose 36 after said fitting is initially placed partially within said end portion of said hose.

Operation

Operation of the invention is quite straightforward. First, before inserting the end portion 46 of hose 36 into trough 26, the operator first rotates lever 28 to the left, to provide sufficient clearance for end portion 46 to pass beneath compression member 32 into trough 26. The end portion 46 is positioned with the end 34 of hose 36 positioned normally about 1.5" to 2.5" past the right end of the trough 26; this is necessary since the end portion 46 of hose 36 is compressed during the fitting insertion operation. This placement may of course vary depending upon the nature of the hose material. Once the hose is suitably positioned in trough 26, the operator then moves the handle of lever 28 to the right, causing the compression member 32 of lever 28 to move downward and leftward, locking the hose 36 in place.

Figure 4:
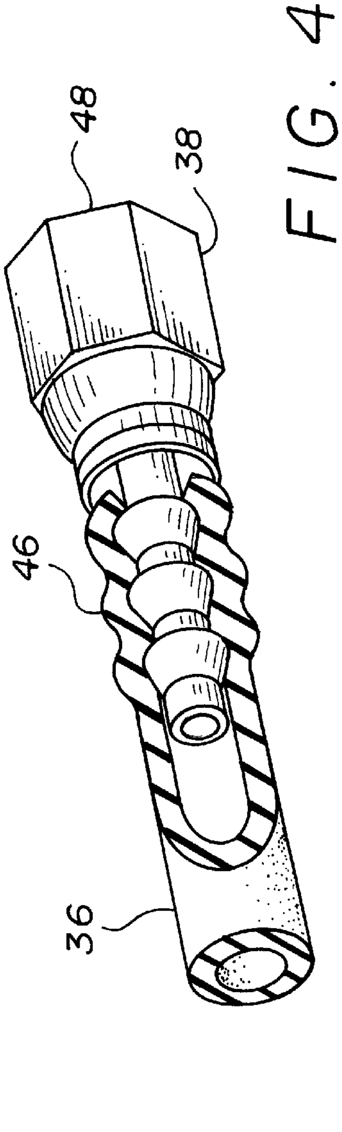
FIG. 4 is an enlarged perspective view, partially in section, of a portion of FIG. 3 showing the fitting installed in the end of the hose.

Once the hose is properly positioned as described above, a hose fitting 38 is lubricated by the operator, using a mild soap and water solution or alcohol, after which the operator partially inserts fitting 38 into end 34 of hose 36. Using his or her left hand, the operator wraps and tightens the fingers around end portion 46 of hose 36 and the right portion of trough 26, so as to insure that end portion 46 will not buckle up during the fitting insertion operation. The operator then repeatedly pumps handle 14 of mechanism 10 with his or her right hand, causing mechanism 10 to move leftward along travel bar 18, until pad 12 first engages the outer end 48 of fitting 38, and then pushes fitting 38 as far into end portion 46 of hose 36 as it will go, so that fitting 38 is firmly secured upon the inner wall of end portion 46 of hose 36. This latter portion of the operation is illustrated in FIGS. 3 and 4.

After installation of fitting 38 in the end portion 46 of hose 36, the operator pulls the release trigger 16, allowing mechanism 10 and pad 12 to be moved to the right, away from trough 26, releasing the pressure on fitting 38 and hose 36. The operator then rotates lever 28 to the left, releasing hose 36 from trough 26. The fitting 38 is now fully installed into hose 36 and ready for use in various kinds of fluid transfer operations.

Some Possible Variations of Embodiments

Those familiar with the art will appreciate that the invention may be employed in a variety of configurations without departing from the essential substance thereof.

For example and not by way of limitation, the platform 20 may be connected to travel bar 18 in any number of suitable ways, e.g. by the use of the injection molding process allowing a plastic travel bar 18 to be embedded into a plastic injection-molded platform 20, rather than through use of the bolts 22.

As a means for securing the end portion 46 of hose 36 in position for the fitting insertion process, one would not necessarily have to employ the very specific means of the preferred embodiment disclosed above. For example, in lieu of the lever 28 with its compression member 32, one might employ a spring-powered clamp instead. Additionally, for persons with handicapped and/or missing hands, a second clamping mechanism could also be added to the rightward end of the horizontal ergonomic wing 24. A lever or spring-powered clamping mechanism could be used to keep the hose from buckling upward during fitting installation, thus taking the place of the operator's missing or dysfunctional hand. This would allow a person with only one functional hand to operate the device; however, a vise-mounting adapter would be an essential component for this configuration.

Although the preferred embodiment employs a flat pad 12 as a pusher means for pushing the fitting 38 into end 34 of hose 36, one would not necessarily have to use a flat pad. One might instead employ a pad having a shape matching the end of fitting 38, such as a conical shape that would protrude into a hollow fitting 38, for pre-insertion holding purposes. The flat shape of pad 12 has the advantage of not being dependent upon particular dimensions, however, as to the exact height of fitting 38 above travel bar 18, provided the pad 12 has sufficient height to accommodate the range of dimensions of interest. No particular composition is required for pad 12, which could appropriately be made from rubber, which might be moldable or hard rubber; rubber would be preferable to metal, to avoid any possible damage to fitting 38 during the insertion process. The pad 12 is removable so as to be interchangeable with various styles that could be developed.

Although the invention would normally be used with the travel bar 18 and trough 26 in an at least substantially horizontal orientation, it is of course possible to employ the invention oriented in other configurations as well; reference to a horizontal configuration of travel bar 18 and trough 26 in any of the claims is made for purposes of facilitating description of relative orientations of components in this normal configuration, and is not to be understood as limiting the use of the invention to such orientation.

The invention could be employed with an alternate form of the fitting installation mechanism 10, which could be a ratcheting mechanism having ratchet teeth engaging corresponding notches along the travel bar 18, with the ratcheting operation, for movement of the fitting installation mechanism 10 along the travel bar 18, being performed by hand pumping of the handle 14.

Although the preferred embodiment shown in the drawings and described above is intended for use by a right-handed person, one could of course readily fabricate a form of the invention useful by a left-handed person, by simply reversing the entire design and correspondingly changing the operational procedure, in a manner which would be readily apparent to one familiar with the art, from the disclosure already given.

The scope of the invention is defined by the following claims, including also all subject matter encompassed by the doctrine of equivalents as applicable to the claims.

I claim:

1. An apparatus for installing a hose fitting into an end of a hose, comprising:

a travel bar;

a hose mounting platform attached to said travel bar;

a fitting installation mechanism movably connected to said travel bar, said mechanism in part comprising a pusher for pushing the fitting into said hose, said fitting installation mechanism further comprising a hand-operated compression and release mechanism for moving said fitting installation mechanism along said travel bar towards said hose mounting platform; and a hose securing means, for securing the end of the hose to said hose mounting platform.

2. The apparatus of claim 1, wherein said hose securing means comprises a hose clamp comprising a hose locking and release lever rotatably attached to said platform and an elliptically-shaped compression member disposed at a bottom of said lever, positionable as to allow the end of the hose to freely pass beneath said compression member in one rotatable configuration of said locking and release lever, and to cause said compression member to firmly press the hose into a locked configuration for another rotatable position of said hose locking and release lever.

3. The apparatus of claim 1, wherein said fitting installation mechanism further comprises a release trigger for releasing said fitting installation mechanism from the fitting after the fitting is installed into the end of the hose.

4. The apparatus of claim 1, further comprising a first stop attached to said travel bar between said hose mounting platform and said fitting installation mechanism, for stopping motion of said fitting installation mechanism before said pusher makes contact with said hose mounting platform.

5. The apparatus of claim 1, further comprising a second stop attached to said travel bar between said fitting installation mechanism and an end of said travel bar opposite said hose mounting platform, for stopping motion of said fitting installation mechanism before said mechanism can come off of said end of said travel bar.

6. The apparatus of claim 1, further comprising a first stop attached to said travel bar between said hose mounting platform and said fitting installation mechanism, for stopping motion of said fitting installation mechanism before said pusher makes contact with said hose mounting platform.

7. The apparatus of claim 1, further comprising a second stop attached to said travel bar between said fitting installation mechanism and an end of said travel bar opposite said hose mounting platform, for stopping motion of said fitting installation mechanism before said mechanism can come off of said end of said travel bar.

8. An apparatus for installing a hose fitting into an end of a hose, comprising:

a travel bar;

a fitting installation mechanism movably connected to said travel bar, said mechanism in part comprising a pusher located above said travel bar when said travel bar is oriented horizontally, for pushing said fitting into the hose, said mechanism further comprising a hand-operated compression and release mechanism for moving said mechanism along said travel bar;

a hose mounting platform, attached to said travel bar and extending above said travel bar when said travel bar is oriented horizontally, comprising a surface portion above said travel bar when said travel bar is oriented horizontally and at least substantially parallel to said travel bar; and a hose securing means, for securing the end of the hose to said surface portion of said hose mounting platform.

9. An apparatus for installing a hose fitting into an end of a hose, comprising:

a means for securing the end of the hose in a fixed position upon an axis coinciding with and extending from the axis of the end of the hose;

a pusher located upon said axis; and a compression and release pusher movement means, located off of said axis and connected to said pusher means, for moving said pusher means on said axis toward the end of the hose sufficiently to push the fitting into the end of the hose after the fitting is initially placed partially within the end of the hose.

10. The apparatus of claim 9, wherein said axis is at least substantially horizontal, and said pusher movement means is located below said axis.

11. The apparatus of claim 10, wherein said pusher movement means comprises a hand-operated compression and release mechanism movably connected to a travel bar.

12. The apparatus of claim 9, wherein said pusher means comprises a flat pad.

13. An apparatus for installing a hose fitting into an end of a hose, comprising:

a travel bar;

a hose mounting platform attached to said travel bar;

a fitting installation mechanism movably connected to said travel bar, said mechanism in part comprising a pusher for pushing the fitting into said hose, said fitting installation mechanism further comprising a hand-operated compression and release mechanism for moving said fitting installation mechanism along said travel bar towards said hose mounting platform, said fitting installation mechanism further comprising a release trigger for releasing said fitting installation mechanism from the fitting after the fitting is installed at the end of the hose; and a hose securing means, for securing the end of the hose to said hose mounting platform.

14. The apparatus of claim 13, wherein said hose securing means comprises a hose clamp comprising a hose locking and release lever rotatably attached to said platform and an elliptically-shaped compression member disposed at a bottom of said lever, positionable as to allow the end of the hose to freely pass beneath said compression member in one rotatable configuration of said locking and release lever, and as to cause said compression member to firmly press the hose into a locked configuration for another rotatable position of said hose locking and release lever.

15. The apparatus of claim 13 wherein said hand-operated compression and release mechanism comprises a compression and release handle.

16. An apparatus for installing a hose fitting into an end of a hose, comrpising:

a travel bar;

a hose mounting platform attached to said travel bar;

a fitting installation mechanism movably connected to said travel bar, said mechanism in part comprising a pusher for pushing the fitting into said hose, said fitting installation mechanism further comprising a hand-operated compression and release mechanism for moving said fitting installation mechanism along said travel bar towards said hose mounting platform;

a hose securing means, for securing the end of the hose to said hose mounting platform; and a first stop attached to said travel bar between said hose mounting platform and said fitting installation mechanism, for stopping motion of said fitting installation mechanism before said pusher makes contact with said hose mounting platform.

17. The apparatus of claim 16, wherein said hose securing means comprises a hose clamp comprising a hose locking and release lever rotatably attached to said platform and an elliptically-shaped compression member disposed at a bottom of said lever, positionable as to allow the end of the hose to freely pass beneath said compression member in one rotatable configuration of said locking and release lever, and as to cause said compression member to firmly press the hose into a locked configuration for another rotatable position of said hose locking and release lever.

18. The apparatus of claim 16, wherein said fitting installation mechanism further comprises a release trigger for releasing said fitting installation mechanism from the fitting after the fitting is installed into the end of the hose.

19. The apparatus of claim 16, further comprising a second stop attached to said travel bar between said fitting installation mechanism and an end of said travel bar opposite said hose mounting platform, for stopping motion of said fitting installation mechanism before said mechanism can come off of said end of said travel bar.

20. The apparatus of claim 16 wherein said hand-operated compression and release comprises a compression and release handle.

21. An apparatus for installing a hose fitting into an end of a hose, comrpising:

a travel bar;

a hose mounting platform attached to said travel bar;

a fitting installation mechanism movably connected to said travel bar, said mechanism in part comprising a pusher for pushing the fitting into said hose, said fitting installation mechanism further comprising a hand-operated compression and release mechanism for moving said fitting installation mechanism along said travel bar towards said hose mounting platform;

a hose securing means, for securing the end of the hose to said hose mounting platform; and a stop attached to said travel bar between said fitting installation mechanism and an end of said travel bar opposite said hose mounting platform, for stopping motion of said fitting installation mechanism before said mechanism can come off of said end of said travel bar.

22. The apparatus of claim 21, wherein said hose securing means comprises a hose clamp comprising a hose locking and release lever rotatably attached to said platform and an elliptically-shaped compression member disposed at a bottom of said lever, positionable as to allow the end of the hose to freely pass beneath said compression member in one rotatable configuration of said locking and release lever, and as to cause said compression member to firmly press the hose into a locked configuration for another rotatable position of said hose locking and release lever.

23. The apparatus of claim 21, wherein said fitting installation mechanism further comprises a release trigger for releasing said fitting installation mechanism from the fitting after the fitting is installed into the end of the hose.

24. The apparatus of claim 21, further comprising another stop attached to said travel bar between said hose mounting platform and said fitting installation mechanism, for stopping motion of said fitting installation mechanism before said pusher makes contact with said hose mounting platform.

25. The apparatus of claim 21 when said hand-operated compression and release mechanism comprises a compression and release handle.

26. An apparatus for installing a hose fitting into an end of a hose, comprising:

a travel bar;

a hose mounting platform attached to said travel bar;

a fitting installation mechanism movably connected to said travel bar, said mechanism in part comprising a pusher for pushing the fitting into said hose, said fitting installation mechanism further comprising a hand-operated compression and release mechanism for moving said fitting installation mechanism along said travel bar towards said hose mounting platform; and a hose securing means, for securing the end of the hose to said hose mounting platform, and said hose securing means comprises a hose clamp comprising a hose locking and release lever rotatably attached to said platform and an elliptically-shaped compression member disposed at a bottom of said lever, positionable as to allow the end of the hose to freely pass beneath said compression member in one rotatable configuration of said locking and release lever, and as to cause said compression member to firmly press the hose into a locked configuration for another rotatable position of said hose locking and release lever.

27. The apparatus of claim 26 when said hand controller comprises a compression and release handle.

* * * * *

UNITED STATES PATENT AND TRADEMARK OFFICE

CERTIFICATE OF CORRECTION

PATENT NO. : 6,658,711 B1 
DATED : December 9, 2003
INVENTOR(S) : Joel Kent Benson It is certified that error appears in the above-identified patent and that said Letters Patent is hereby corrected as shown below:

Title page,
Item [57], ABSTRACT,
Line 4,"paid" should read -- pad --

Column 7,
Line 23, "comrpising" should read -- comprising --

Signed and Sealed this

Seventh Day of September, 2004

JON W. DUDAS
*Director of the United States Patent and Trademark Office*